Figures 4, 5, 6:
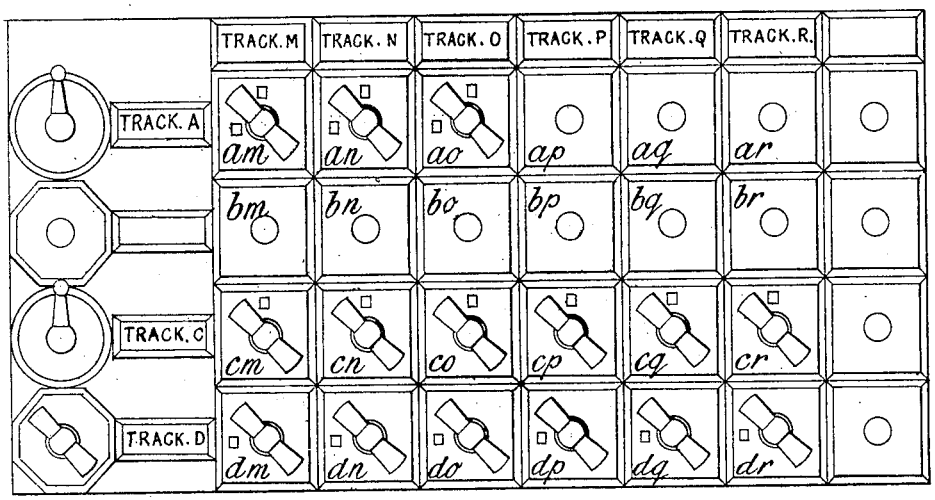

No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 1.
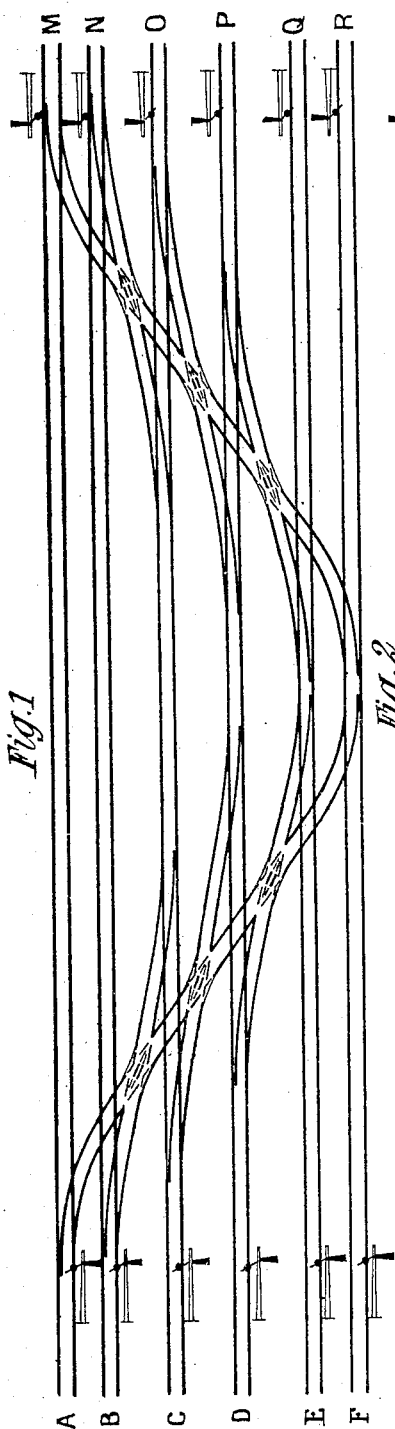
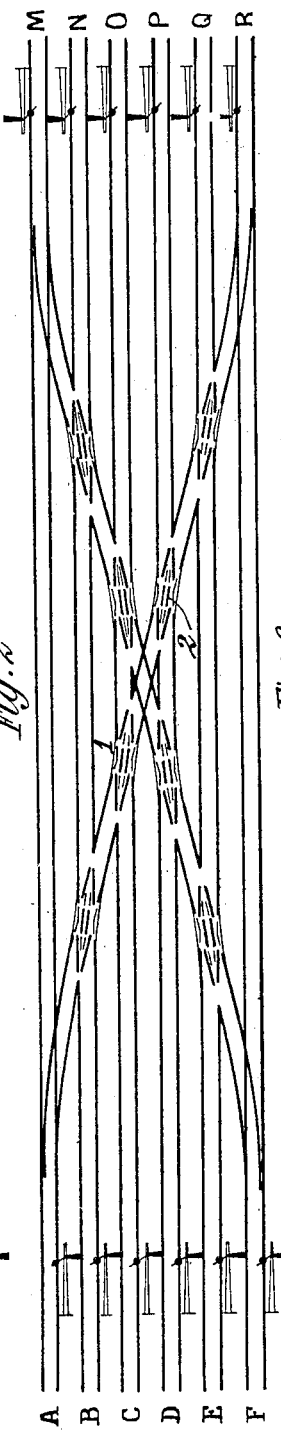
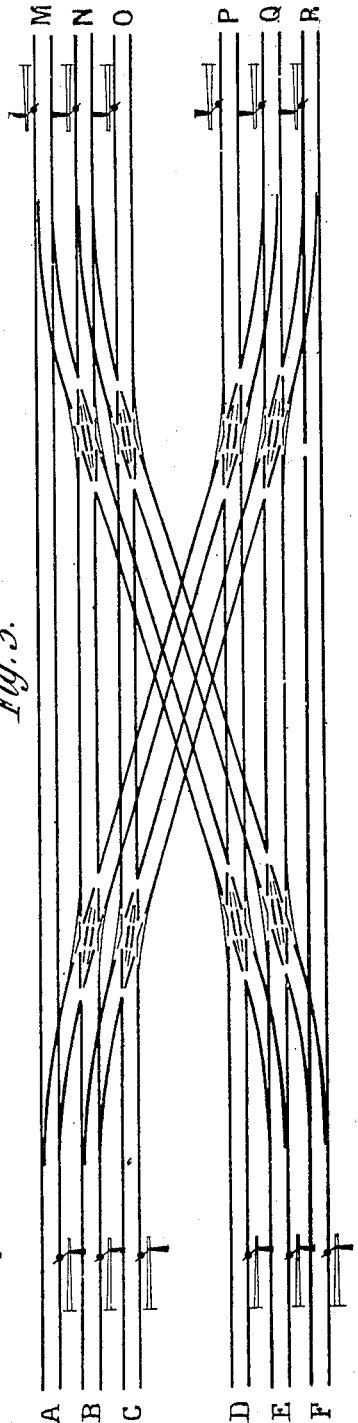

No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.

9 SHEETS—SHEET 2.

WITNESSES:
Fred White
René Bruine

INVENTORS:
Alfred Monard, Horace Dumartin
and Ernest Albert Moutier,
By their Attorneys No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 3.
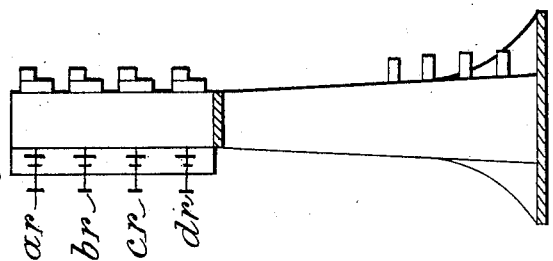
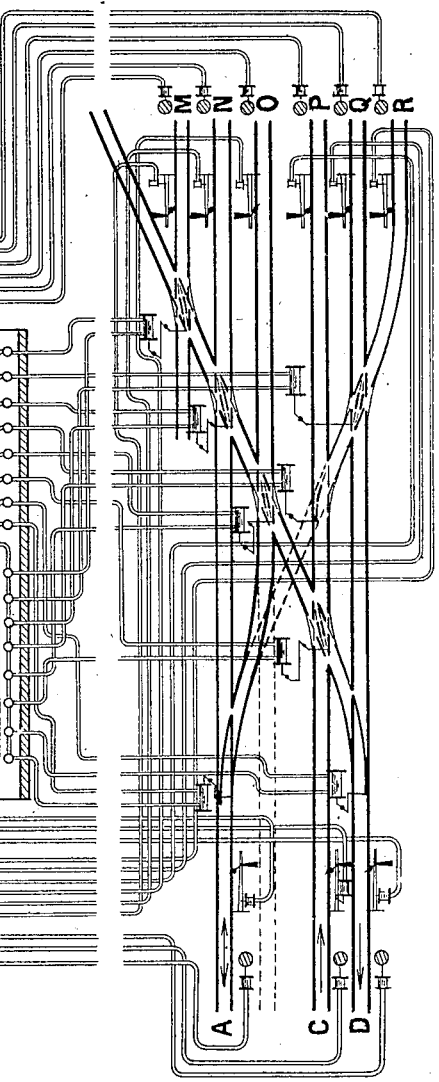
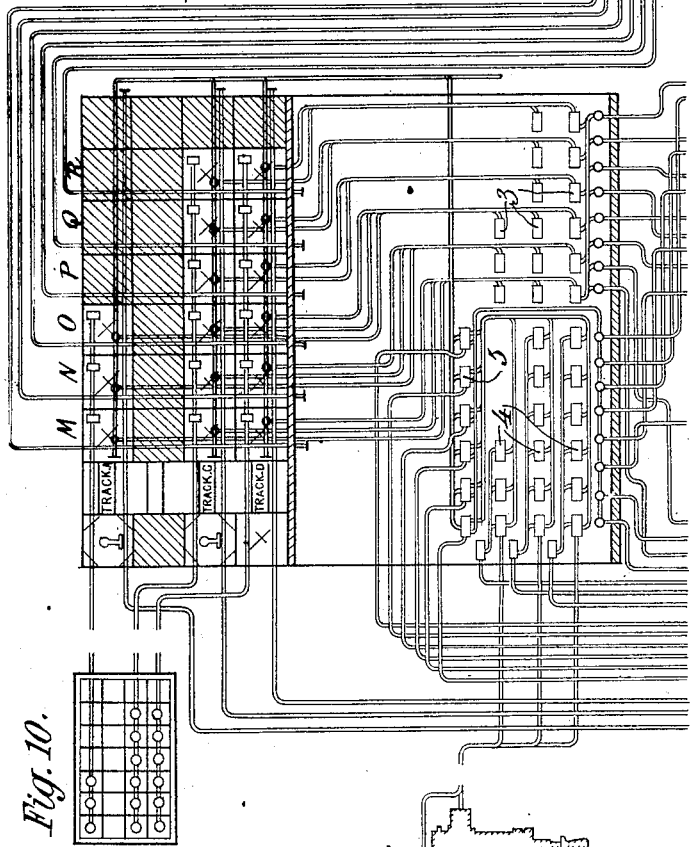
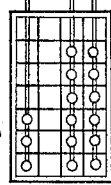
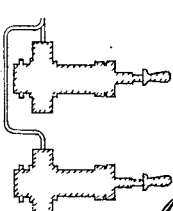
WITNESSES:
Fred White
René Bruine
INVENTORS:
Alfred Monard, Horace Dumartin,
and Ernest Albert Moutier
By their Attorneys
Arthur E. Rasert No. 878,552.
PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 4.
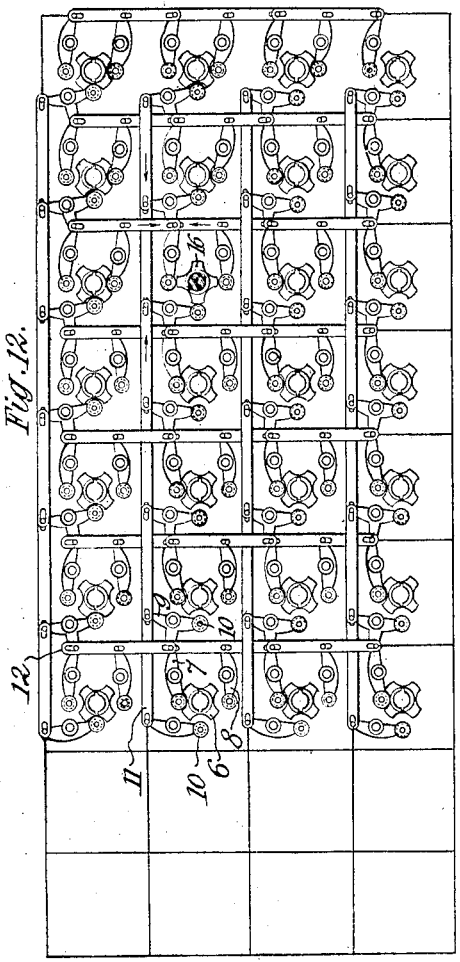
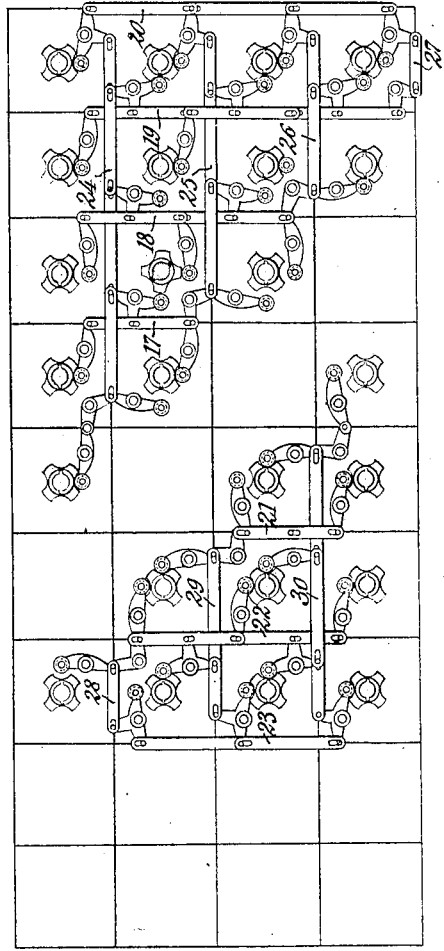
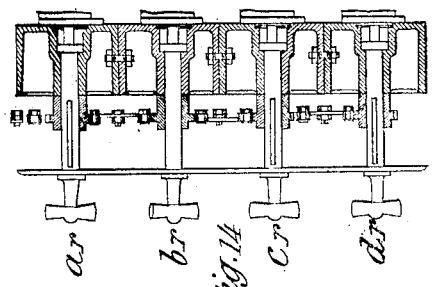
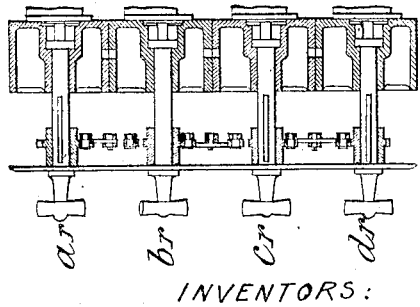
WITNESSES:
Fred White
Rene Bruine
INVENTORS:
Alfred Monard, Horace Dumartin,
and Ernest Albert Moutier,
By their Attorneys
Arthur E. Frazer Co.

No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 5.
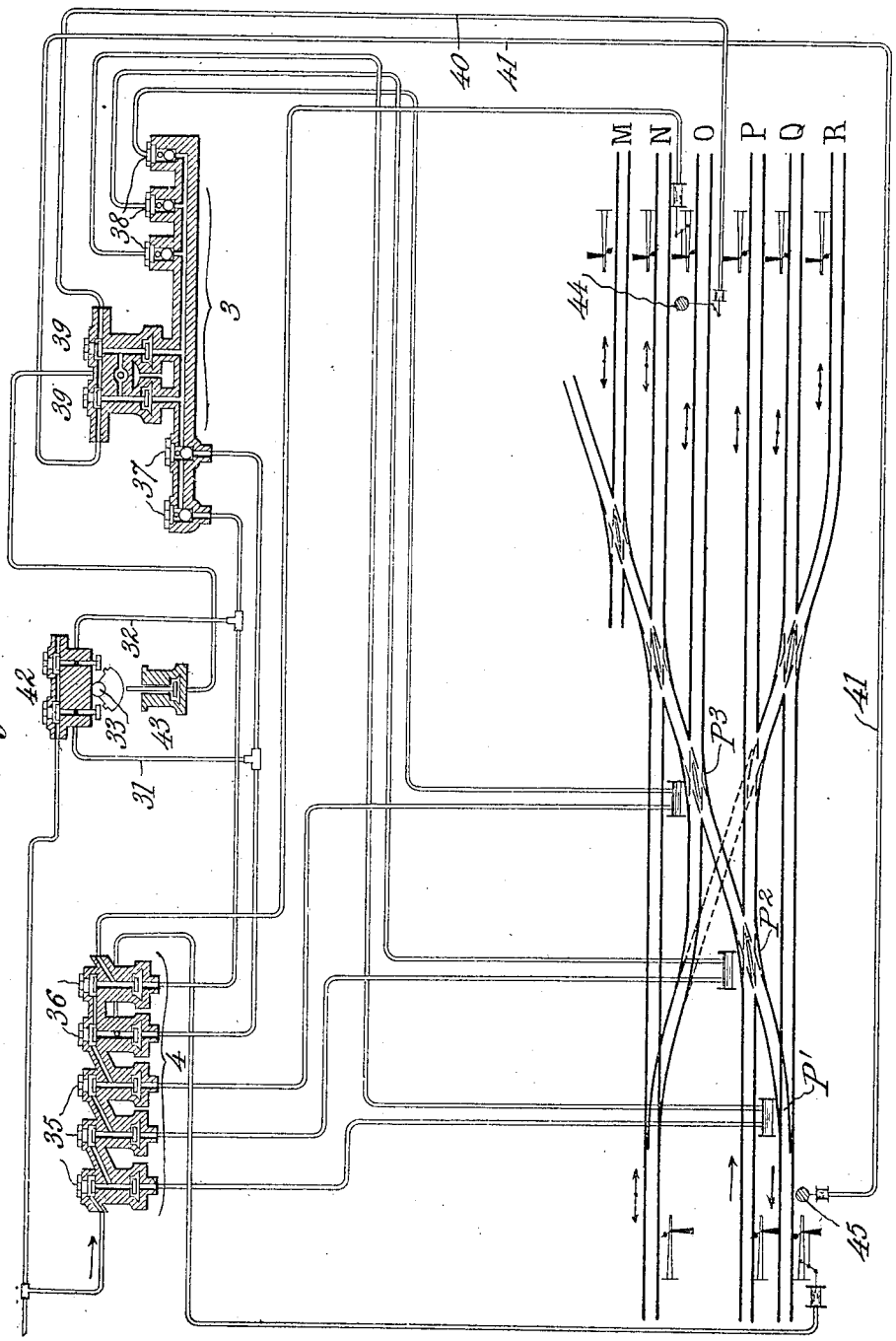
WITNESSES INVENTORS

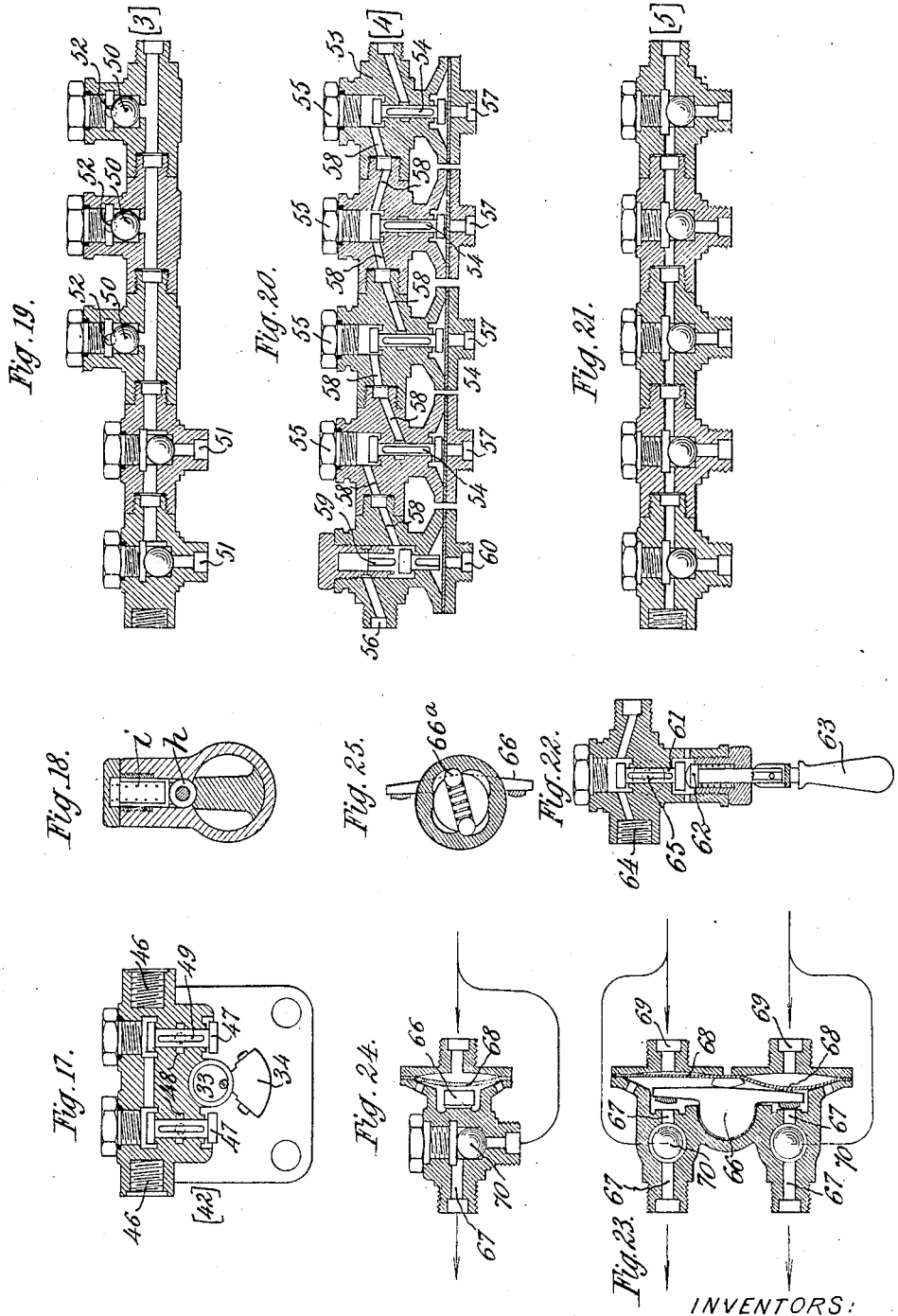

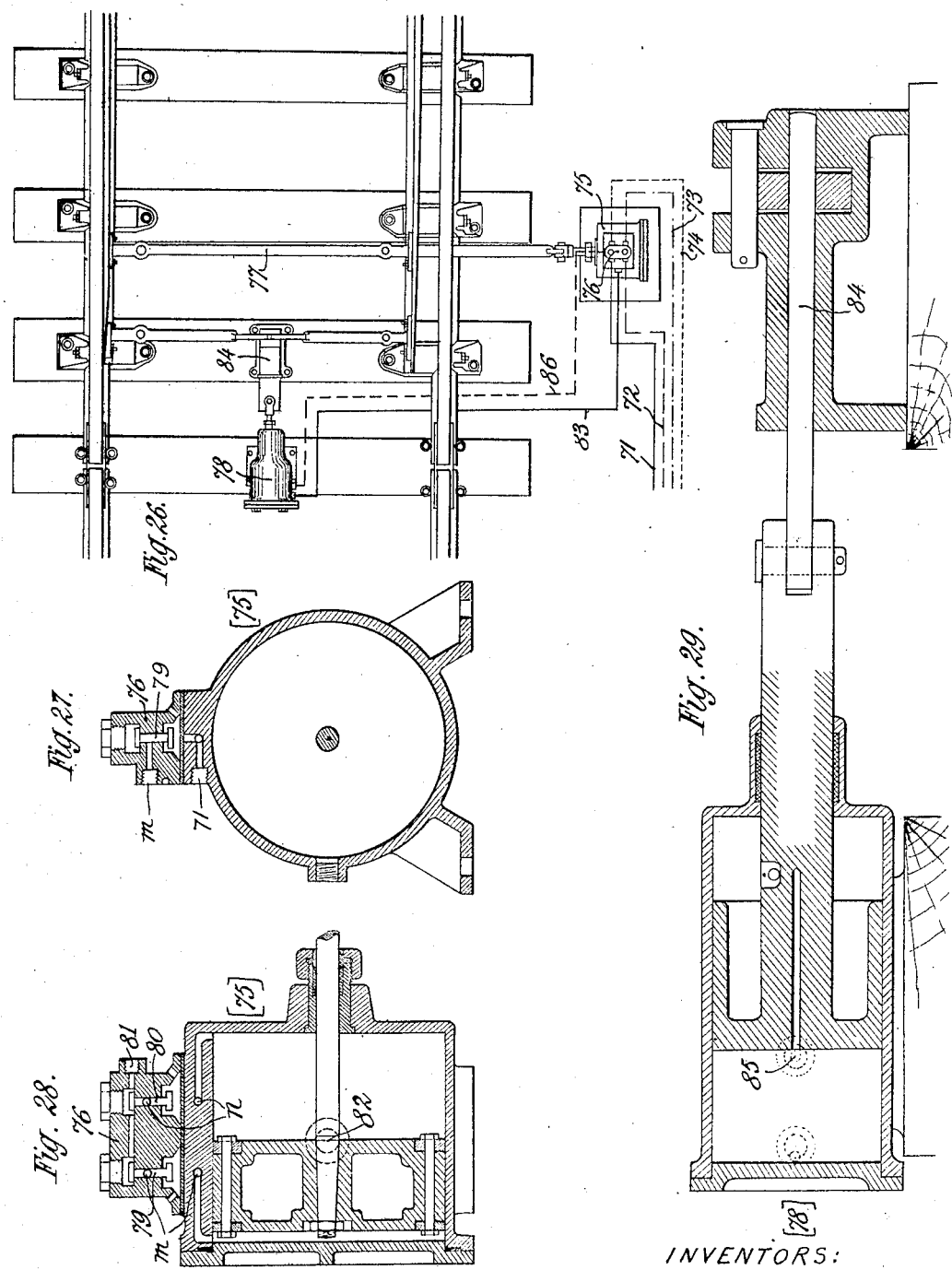

No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 8.
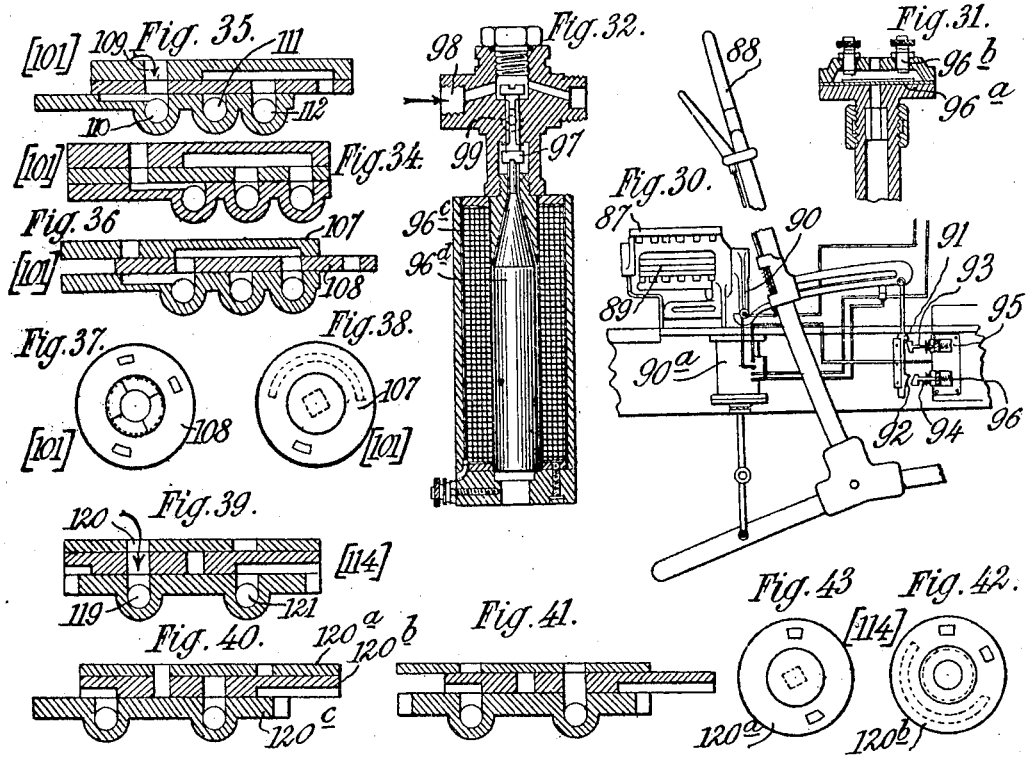
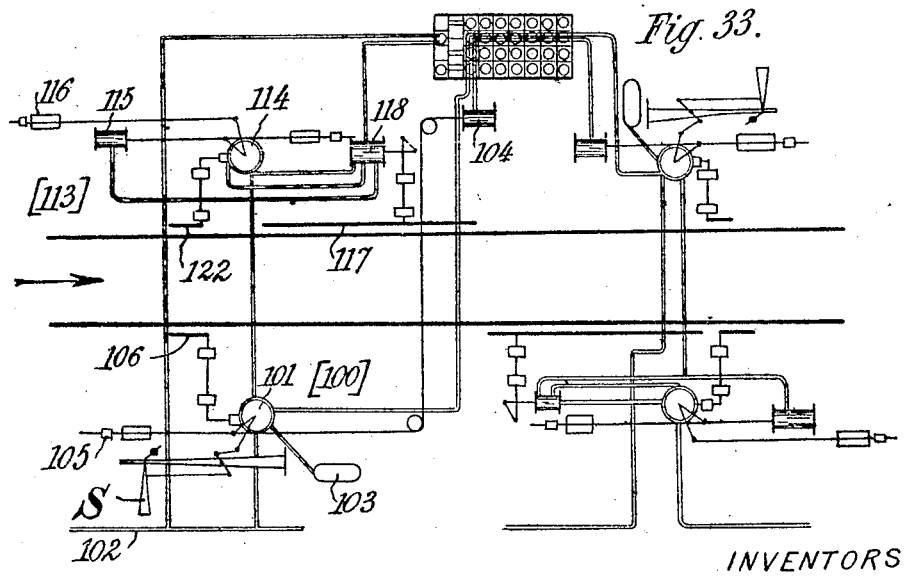
WITNESSES:
Fred White
René Ruine
INVENTORS:
Alfred Monard, Horace Dumartin
and Ernest Albert Moutier,
By their Attorneys No. 878,552. PATENTED FEB. 11, 1908.
A. MONARD, H. DUMARTIN & E. A. MOUTIER.
APPARATUS FOR WORKING AND INTERLOCKING SWITCH POINTS
AND SIGNALS FOR RAILWAYS.
APPLICATION FILED NOV. 10, 1905.
9 SHEETS—SHEET 9.
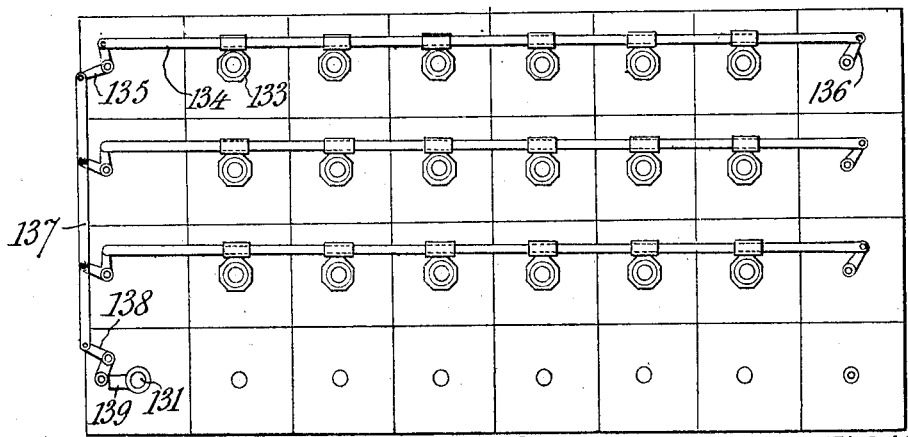
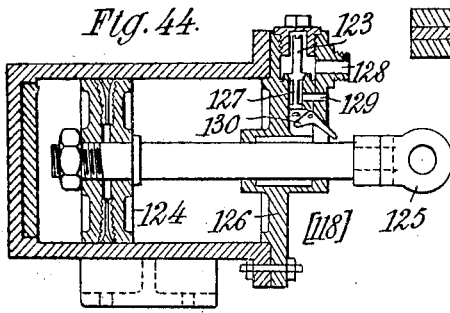
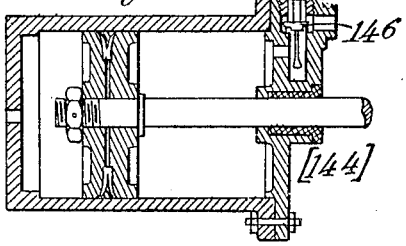
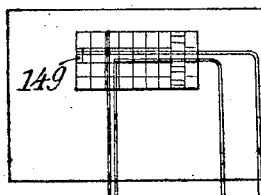
WITNESSES
Fred White
René Ruine
INVENTORS:
Alfred Monard, Horace Dumartin,
and Ernest Albert Moutier,
By their Attorneys

UNITED STATES PATENT OFFICE.

ALFRED MONARD, HORACE DUMARTIN, AND ERNEST ALBERT MOUTIER, OF PARIS, FRANCE.

APPARATUS FOR WORKING AND INTERLOCKING SWITCH-POINTS AND SIGNALS FOR RAILWAYS.

No. 878,552.  Specification of Letters Patent.  Patented Feb. 11, 1908.

Application filed November 10, 1905. Serial No. 286,722.

*To all whom it may concern:*

Be it known that we, ALFRED MONARD, a subject of the King of Belgium, residing in Paris, France, and HORACE DUMARTIN and ERNEST ALBERT MOUTIER, both citizens of the Republic of France, residing in Paris, France, have jointly invented certain new and useful Improvements in Apparatus for Working and Interlocking Switch-Points and Signals on Railways, of which the following is a specification.

This invention relates to improvements in the switchman's levers and apparatus in connection therewith for controlling from a distance by means of fluid pressure or other motive power the switch points and signals of railways, with a view both to the interlocking thereof and to the combined action of the apparatus serving to work and control the switch points governed thereby, in order that:

1. The whole of the locking gear and of the apparatus for working and controlling the switch points and signals may be arranged in a single movable building which can be readily erected in the course of a few hours at the place where it is required.

2. That the interlocking gear shall operate according to general rules whereby to select either those apparatus which can be applied in all cases, or those which are particular to each station.

3. That these working and controlling apparatus shall be so arranged that the time required for the operation of the switch apparatus and the signals shall be as short as possible and that they shall be so arranged that all the working combinations can be effected exclusively in the switchman's cabin, only those operative devices being arranged on the permanent way which are required for directly working the points and signals and the conduits for the fluid pressure which separately connect the cabin with each of these apparatus.

4. That the system shall be applicable to existing installations, *i. e.* cabins with mechanical transmission of the nature of Saxby's; electrical, hydro-dynamic, and pneumatic controlling apparatus, etc. without having to do away with the existing transmission devices or conduits but on the contrary utilizing them to the largest possible extent.

5. That the table carrying the levers shall constitute itself a table of communication, between different cabins or other stations, carrying annunciators which shall fall at the side of the lever whose operation is required, and shall be effaced automatically with the operation of this lever. While the drop or signal appears, the switchman will not have to turn to see it, to read and interpret it, and to operate a certain number of levers, and then to efface it. He will simply operate the lever near which a drop has fallen, and in the direction indicated by the position of the drop, without any thought and without the loss of an instant of time, the operation of this lever being the sole operation required, and the mechanical interlocking devices being arranged to oppose the operation of the lever in case of necessity. The station-master may be thus informed automatically of all the movements and the entire time of their duration, and he can by a simple hand-operated device prohibit every movement which appears to him dangerous or improper.

6. That the general arrangement in the switchman's cabin shall be such that there can be readily and automatically established upon each line of transit, and by the action of the lever that commands this line, a communication which insures the continuity of the block system forward and backward for the protection of all the trains, without exception, which travel within the range of the said cabin, even if it is only a question of traffic which only makes a short incursion into the section in order to pass away again at the same side where it enters. These several conditions can be carried out by all modes of transmitting motion such as electricity, water under pressure, compressed air, vacuum, etc. etc. In the following description it has been assumed that compressed air is employed as the auxiliary power.

Our invention will be readily understood from the following description with reference to the accompanying drawings, in which Figures 1, 2 and 3 are diagrammatic drawings of typical arrangements of the permanent way. Figs. 4 and 5 are graphic delineations of the rules of interlocking. Fig. 6 is a view of the table with the switchman's operating levers. Fig. 7 is a diagrammatic plan showing the arrangement of a railway station in which the lines of rail are connected together by means of transverse crossing lines. Fig. 8 shows a general view of the central controlling apparatus, its connections with the signals and the switch points of the station shown at Fig. 7, and the indicating and disengaging apparatus situated in the office of the superintendent. Fig. 9 shows a side view of the central controlling apparatus. Fig. 10 is a diagrammatic plan of the indicating table. Fig. 11 is a diagram of the disengaging devices which are arranged within sight of the station master and may sometimes be at a distance from the cabin. Fig. 12 shows a front view of the general interlocking gear. Fig. 13 shows a front view of the diagonal interlocking gear. Figs. 14 and 15 show vertical sections respectively of the said two interlocking gears. Fig. 16 shows the whole of the apparatus and connections of an operating lever. Fig. 17 shows a vertical section of the starting valves of an operating lever. Fig. 18 shows a vertical section of the arrangement for locking the lever in its three positions. Fig. 19 shows a section of the operating distributing valves of the same line of transit. Fig. 20 shows a section of the controlling totalizers of the same transit line. Fig. 21 shows the section of a collector of a signal. Fig. 22 shows a vertical section of a disengaging apparatus. Fig. 23 is a horizontal section, Fig. 24 a vertical section, and Fig. 25 a section of the locking device of a balance apparatus which enables the connection with the exhaust of a conduit to be delayed until the moment when the switch points are made to change their position by the motion of another operating lever. Fig. 26 shows the arrangement of the apparatus for operating and controlling a set of switch points when working with compressed air. Fig. 27 shows a cross section, and Fig. 28 a longitudinal section of the cylinder for operating a set of switch points. Fig. 29 shows the arrangement for operating the locking bolts applied to the switch points. Fig. 30 shows the application of our invention to a set of switch points already worked by means of a lever with mechanical transmission devices. Fig. 31 shows an aero-electric valve and Fig. 32 an electro-air valve applied to existing electric controlling devices. Fig. 33 shows a general plan of a block circuit for a certain line of transit extending from the apparatus for the entrance to the apparatus of exit in passing through the central table of the operating levers. Figs. 34 to 38 show the details of the slide valve of an apparatus of entrance, and Figs. 39 to 43 those of an apparatus of exit. Fig. 44 shows a longitudinal section of the cylinder of a block pedal. Figs. 45 and 46 show the provisional locking devices suitable for discharges. Fig. 47 shows a general plan of a safety apparatus for indicating to the signalman of the cabin the entrance of a train in a prohibited section the signal being at danger. Figs. 48 and 49 show a developed section of the circular slide valves for the block system modified with a view to the adaptation to the preceding arrangement. Fig. 50 shows a longitudinal section of the cylinder of the pedal of the safety device.

*Rules of interlocking* (Figs. 1 to 5).—All the levers must be interlocked with each other in such manner that the passage on no two lines can be authorized that are incompatible with each other. According to the methods employed heretofore, the interlocking actions are effected by means of vertical and horizontal bars actuated by the several levers and having suitably placed opposite tappets or slots. The number of these bars is proportional to the number of the levers, so that for a large station they constitute a cumbersome mass necessitating a labor in mounting them in the cabin that requires great care and expenditure of time. In addition, the placing of the opposing tappets or slots is effected by empyric methods which admit of many errors or omissions.

Now if one considers an arrangement of tracks connected with each other by transverse lines, such as shown at Figs. 1, 2 and 3, it will be seen that the most numerous interlockings are those which result from geographical circumstances. Thus, the line of transit C P is incompatible with all the lines which cut through it, namely, the lines coming from A and B, that is, from the northwest, for destinations Q and R, that is, the south-east, and vice versa (assuming the lines to be situated as on a geographical map, the top being the north, the bottom the south, the west to the left and the east to the right). Also, with the same line C P the lines of transit coming from the south-west of the line C passing to the north-east of the line P and vice versa. Furthermore all the lines of transit coming from the west towards the line P and vice versa, and all the lines of transit coming from the east towards the line C and vice versa, are incompatible with the transit on line C P, as having one part of the line in common. What has been said with regard to the line of transit C P also holds good for all the other lines. All these cases of incompatibility rendering the locking action necessary in order to avoid collisions of converging trains, are in many cases the only ones to be considered, and they exist, whatever may be the modifications applied to the apparatus which connect the lines with each other, in the section controlled by the cabin. The locking devices of this kind considered geographically, are therefore very important, and it is important that they should be capable of being composed of mechanism identical for each lever, the combination of such mechanisms connected from lever to lever affording a homogeneous whole which allows of no omission or error. It is therefore necessary to discover the arrangement of the levers which will lend itself to this mode of operating, in one or more planes parallel to all the locking devices, and one means for this purpose consists for example in arranging the levers for the lines of transit upon a board in the form of a pythagorean table as shown at Figs. 4 and 5 which corresponds to the situation shown diagrammatically at Fig. 6. This is a table with double entry, formed of horizontal rows and vertical columns corresponding respectively to each of the lines of rail of the station, and which, when considered from either end of the station, may be either the origin or the termination of a line of transit, or both together. The intersections of these rows and columns constitute compartments in which are placed the levers, the locking devices being similarly arranged, so that the lever of a compartment is that which controls the line of transit between the two points indicated upon the row and the corresponding column. It is therefore found at a glance so soon as it is known what is required to be done, that is, whence a train is coming and where it is to go to. We will consider for example a table thus arranged with the levers of a switchman's cabin controlling two transverse lines of rail with branches arranged as shown at Fig. 7; the central table corresponding to this cabin is of the form shown at Fig. 6. It is indicated diagrammatically at Figs. 8 and 9 with connections with the pedal apparatus of Fig. 7, the corresponding table Fig. 10 and the disengaging devices at Fig. 11.

The table is mounted on a frame in which are all the distributing apparatus. We will assume that a train is to pass from C to P; the lever to be operated is that situated at the meeting point of the row C and the column P, Fig. 4, that is, the lever c p. When this lever is operated it must necessarily lock all the levers of the row C and of the column P, because there must not take place at the same time two movements, even of different origin, converging towards P or towards C. This rule of interlocking action is represented by a cross formed with the hatching lines running upward to the right and passing through the lever c p Fig. 4. Also, at the time of the transit C—P being effected it is impossible to effect any transit, such as B—Q or E N, etc., which will cut that line at any point. All the transits thus prohibited by the lever in question have their levers in the north-east and south-west regions formed by the cross on the table Fig. 4. The corresponding compartments are indicated by hatched lines running downward to the right. They are the geographical interlockings referred to above and which are at once effected for all the compartments, even those having no levers. With this mechanism the addition or withdrawal of a lever can easily be effected when an enlargement or modification of the lines of rail has to be made without requiring the alteration of the interlocking devices that already exist.

When instead of the crossing rail system like that at Fig. 1 (which is more theoretical than practical, and which requires too wide spaces between the lines, causing loss of space) a simple crossing system such as at Fig. 2 is used (which is more frequently employed) the geographical interlockings indicated by simple hatchings in Fig. 4 still exist as before; but they are insufficient. The transits A—O or B—O for example are no longer compatible with the transit C P because they have a point 1 in common. This is the same with the transits D—Q or D—R, which have with C—P the point 2 in common. It is therefore necessary to add to the geographical interlockings the interlockings of the levers a o, b o, d q, d r whose compartments are marked with cross hatchings as at Fig. 5; this result will be obtained if the two levers c o and d p be operated which are situated upon the diagonal line of the table. Therefore, in the case of simple diagonal crossings of the style shown in Fig. 2, the geographical interlockings are not the only ones in action, (except however for the levers situated on the diagonal line of the table in which case the geographical interlockings alone are necessary, as a comparison with Fig. 2 will show.) For any other lever such as c p, a supplemental device must be provided for bringing into action simultaneously the interlockings of the two levers c o and d p, which are its horizontal and vertical projections respectively on the diagonal of the table. The complete set of these supplemental devices operates under a system designated "simple interlocking of the diagonal;" and operates in a single plane which is parallel to the plane of the geographical interlockings in the central table. It may happen, in the case of double diagonal crossing lines for example, that the direction of motion upon a certain transit line may influence the locking of the diagonal line. Lastly certain levers may, on account of local circumstances, have lockings that do not arise from any of the preceding rules; we will call them accidental local or special lockings. They can be provided for special connections between the levers in question, thus forming a third plane in the interlocking apparatus according to their number and extent. In particular, a certain number of lines of rail can be arranged in a group. The interlocking in this case is the same for all the rows or columns of the group as that of the compartment of the group which is situated on the diagonal (group interlocking).

*Geographical interlockings.*—Each of the axes of the levers carries a cam 6 having four notches and which is always engaged therewith by keys (Figs. 12 and 14). Opposite these cams there are in each compartment three levers: two simple levers 7 and 8 and one T shaped one 9. Each of these levers is provided at one end with a roller 10 which is adapted to be engaged with a corresponding notch of the cam 6; all the other free ends of the levers are connected to horizontal and vertical bars 11 and 12 which are of sufficient length for connecting the similar ends of the levers 9 of two contiguous compartments. The connection of these levers to the bars is effected by pins and slots, the motion of the levers being determined by the play of the pins in the slots, which is a function of the lift of the cam. On the vertical bars 12 is situated at about the middle thereof a similar connection to the lever 8 of the corresponding compartment.

When at rest, the cams 6 have their notches arranged according to the vertical and horizontal axes of the board and the rollers 10 of the levers are free. A hand lever as c p, having been moved, its rotation turns the cam 16 through 45°. The rollers 10 move out of the notches and the levers corresponding to numbers 7, 8 and 9 rock and impart motion to the bars 11 and 12, moving them from the four cardinal points as indicated by the arrows at the right of Fig. 12. The bars, in their turn, act on the bars connected thereto and block the rollers in the notches of the cams of all the levers that have to be locked. The T shaped levers 9 serve to transmith the motion of the locking levers on the board and owing to the existence of the slotted holes in the ends of the bars, the motion is only transmitted by a pulling and not by a pushing action. The result is that of the four quadrants of the coördinates of the lever moved, only two are locked, namely the north-east and the south-west. On the drawing (Fig. 12) it is assumed that a cam such as 16 has been moved so as to show clearly the general nature of the rule which applies to all the compartments of the board, namely the interlocking the hand levers in the vertical and horizontal lines through the hand lever mover and of all the hand levers situated in the north-east and south-west of the cross.

*Interlocking of diagonals.*—As above stated, the moving of a hand lever situated outside the diagonal of the board must have the effect of producing the interlocking of the same regions as those that would be influenced by the simultaneous actuation, if it were possible, of the two levers which are the orthogonal projections of the lever in question on the diagonal. It is therefore necessary to produce the interlockings corresponding to the cross-hatched compartments shown in Fig. 5. For this purpose, as shown at Fig. 13, the hand lever axes are provided with cams in a second and parallel plane and which act upon a series of transmitting levers and bars. In reality all the hand levers have cams in the second plane excepting those situated on the diagonal, and the mechanism of this second plane includes a series of vertical bars 17, 18, 19, 20 to the right; 21, 22, 23 to the left; and horizontal bars 24, 25, 26, 27 to the right, and 28, 29, 30 to the left. For double or multiple diagonal crossing systems where each branch has one determined direction of motion, similar locking means are provided in two or several planes, the operating lever being adapted to be thrown into or out of gear with any one of these planes, according to the direction of motion.

*Action of the operating levers thus grouped and interlocked.*—In this system there are two conduits for pressure fluid, 31 and 32, one for each direction, for each hand lever, which at Fig. 16 is represented by its axis 33; they are employed for distributing by means of the distributers 3, the pressure fluid necessary for working the switch points of the corresponding line of transit, for insuring the communication of the control fluid totalized at 4, and for finally passing to the apparatus for operating the signal of the transit line in question so as to show "line clear". Also by acting on two special valves 39 the pressure fluid establishes the continuity of the two parts 40 and 41 of the block conduit corresponding to the said transit line. For this purpose the operating lever when turned in one direction or the other acts upon a double valve 42 called "depart valve" which may be arranged, for example, as shown at Figs. 16 and 17. The fluid pressure of the main conduit arrives at top at 46, the discharge is effected below at 47 and the conduit of the operating apparatus communicates with the middle at 48. The operating lever having been turned, its axis effects the rotation of the sector 34 which lifts the valve 47 corresponding to the direction of motion. The lever is kept in its end position by a roller $h$, Fig. 18, subjected to the action of a push spring $i$.

The diagrammatic view at Fig. 16 shows exactly how the valves are arranged for a certain transit in two directions. The fluid pressure sent by one of the special conduits to the lever according to the position of the valve body 49 in the valve 42, operates simultaneously:—1. Upon the distributers 3 whence it is distributed to the points $p'$, $p^2$, $p^3$ of the transit line. 2. Upon the totalizer 4 of the same line, where it lifts one or the other of the valves 36 of the signal, according to the direction of rotation of the lever. Each communication of a distributer 3 Fig. 19 is provided with a check valve 50. These apparatus are situated in the lower part of the frame of the lever board Fig. 8 where they are suitably grouped. The control fluid from each of the points returns separately to the totalizers Figs. 8 and 20 of the central apparatus without there being, necessarily, a conjunction device which would increase the interval of time between the operation of the pointsman's lever and the setting of the signal to line clear.

Each element of the totalizer Fig. 20 comprises a casing 53 in which moves a valve body 54. A fluid-tight plug 55 closes the casing. The fluid pressure of the main conduit passes through the conduit 56. The control pressure fluid of a set of switch points passes through the duct 57 and acts under the valve 54 which it lifts by means of a membrane and thus closes the discharge. The pressure from the main conduit passes through 58 from one element to the other and passes to the signal if the valves of the control devices are all lifted; if not, the pressure fluid stops at the valve which is not lifted. If after the complete action of the totalizer and consequently the setting to "line clear" of the signal a set of switch points gets out of order, its control fluid passes to the discharge and the valve drops. The supply of pressure fluid is closed, the cylinder of the signal is opened to discharge and the signal moves to danger.

The grouping of the totalizers is effected on the frame of the central apparatus in the same manner as the distributers, Fig. 5, and the conduits conveying the pressure fluid to the signal communicate with the collectors 5, (Figs. 8 and 21) belonging to each signal.

There is added to each totalizer an element similar to the control elements and in series therewith. This element Figs. 16 and 36, receives the pressure fluid through a branch on the supply duct of the corresponding transit line passing to the distributer. By this means the totalizer corresponding to a transit line only sends pressure fluid to the signal for setting it to line clear if this line is the one which has been authorized from the central cabin. Disengaging devices Fig. 22 are operated from any point where it is required to prohibit a certain transit, for example from the station-master's office. They consist of a double valve 61 in a casing operated upon by a spring push 62 which is actuated by a handle 63. The pressure fluid enters at 64. If the handle be moved horizontally the spring expands and the valve 61 is lifted and allows the pressure fluid coming from 64 to pass into the ducts 65, whence it passes through 60 to the totalizer 4 corresponding to the transit line which it is desired to close passing under a double valve 59 the reverse of that above described and which is the first of the row of valves shown at Fig. 20. The fluid pressure raises this valve which intercepts the fluid pressure of the main conduit that supplies the following totalizing valves, so that notwithstanding the operating of these the motive current cannot pass for operating the signal, and if the latter is already at line clear, it will be brought to danger, as the duct of its apparatus will be put to discharge.

*Reciprocal communication between the pontoon and cabin and other signal boxes having relation therewith.*—In each compartment of the lever board there is a window in front of which there can drop in a visible position one or more indicators which are disengaged electrically from a distance (after the manner of the ordinary shutters of room indicators) from neighboring signal boxes which have to ask for a movement. The indicator appears thus right in front of the lever which is to be operated, without there being any necessity to think of or invent any code of intercommunication phrases which are often subject to a misinterpretation. Further, upon each lever of our apparatus there is mounted a multiple contact which allows of sending automatically to each signal box that is interested, and more particularly to the superintendent, an indication of the movements which have been effected. These indications last in the office of the superintendent so long as the movement lasts on a lever board which is identical (Fig. 10) as regards shape and arrangement but is of necessity of much smaller dimensions than that of the arrangement of levers in the signal box.

*Actuation of the switches.*—The actuation or setting of the switch points is effected locally by means of special motors of the compressed air type (Fig. 26). The operating power is transmitted from the lever board through the two ducts 71 and 72 and, after operating, returns through the ducts 73 and 74. The operating cylinder 75 is provided with a valve box 76 into which the ducts open. The movement is transmitted to the switch points by means of the bar 77. The bolt of the switch points is operated by the cylinder 78. The movement of the parts under the action of the fluid pressures is as follows: See Figs. 26 to 29. The pressure fluid coming from the lever table by way of the conduit 71, for example, arrives at the casing 76 and lifts the membrane of the valve 79 and the valve itself. This valve 79 then allows to pass the pressure of the general conduit which exists always in 81. This pressure passes by way of the conduit $m$ (Figs. 26 and 27) to the face of the piston of the motor cylinder 75. The other valve 80 rises in order to allow of the passage of the checking current which will arrive subsequently from the locking gear. The piston being at the end of its stroke, uncovers an aperture 82 which allows of the passage of the pressure fluid in the duct 83 passing from the cylinder 78 to the bolt device 84. This cylinder is bored to two diameters in which works a double-action piston, the smaller area of which is constantly subjected to the pressure in the main duct and which when in the rest-position keeps the switch unlocked. The pressure acting behind the larger area of the piston in cylinder 78 pushes forward the same and with it also the bolt which engages in the cross bar of the switch. When the piston in the cylinder 78 is at the end of its stroke, it uncovers an aperture 85 which is in communication with the duct 86. The conduit 86 divides, in the casing 76, into two return control conduits 73 and 74, which return to the lever table. The conduit 86 is respectively in communication with 73 and 74. When the pressure in the conduit 71 lifts the diaphragm beneath the valve 79, the valve 80 will not be lifted, and the return pressure through 86 will pass only into the conduit 73 and thence to the central table, and finally to the signal, while the conduit 74 will remain closed. When the traffic line is destroyed on the lever board, the operating duct 71 is placed in communication with the exhaust, and the two valves 79 and 80 close again. The cylinder 75 exhausts, as also the duct 74 of the control current, and the cylinder 78 of the bolt. The piston of the cylinder 75 remains in position, and with it the switch points, but the piston of the cylinder 78 is forced back by the constant pressure, whereby the switch points are unlocked and can then be moved back. The system is entirely symmetrical. As regards the other direction, the identical valves will act.

*Absence of normal position of the switch points.*—All has been arranged intentionally in the foregoing with the object of obviating the possibility of moving a set of points under a train in case when, through an unforeseen circumstance, a lever for a transit line might be returned to its position of rest while the train is still situated on the said transit line. When, in all arrangements hitherto known, a lever is returned to its rest position, the apparatus or apparatuses connected with this lever return with it to a determined position known as the normal position, which is assigned to them. According to our invention, we dispense with this necessity which may become dangerous in case of the apparatus of the track being returned prematurely before the whole of the train has passed over same. We leave the switch points in the position in which they were moved for the last line of transit. Besides, the presence of the motive fluid during the whole time of the passage of the train, insures the necessary solidarity through the medium of this fluid between the operating lever and all the track apparatus which are situated under the train. This arrangement allows also of effecting an economy in the motive fluid, by arranging side by side two conduits to the right and left of the same switch point, and in superposing on them an apparatus called a "balance". With this balance it is unnecessary to empty a conduit which has just been used, except when the complementary conduit has to be put under pressure for an opposite movement of the switch point. This balance is shown in Figs. 23 and 25. The balance consists of a rocking beam 66 whose ends are provided with rubber pads bearing upon the apertures 67 situated in front thereof. The rocking beam is operated by means of the diaphragms 68 which are actuated respectively by means of branch ducts 69 from the operating pressure ducts coming from the power house. Each of these two fluid pressures, on its way to the switch points, goes by a branch or by-pass around the duct and raises a check valve 70 the casing of which communicates laterally with the atmosphere by means of the ducts 67. In a different but parallel plane shown in Fig. 25 the spindle of the rocking beam is provided with a device consisting of an internal spring acting upon two balls $66^a$ bearing on inclined planes. The pressure of the spring causes the rocking beam to remain in the position in which it has been placed by the diaphragm that was last operated. As designed our system in general accommodates itself to the plant of existing switchmen's cabins, particularly as regards those having a mechanical transmitting gear of the Saxby type. The only modification to be made in the latter consists in rendering the engaging apparatus of those cabins inoperative by removing all the tappets from the horizontal bars 87 (Fig. 30), unless it be preferred to disconnect all the levers 88 from the locking gear table 89 by unkeying, in the case of each lever, the connecting rod 90 which attaches it thereto. If therefore for any reason it were desired to make use of the Saxby apparatus in its original integrity, it will only need a few minutes in order to restore the current arrangement.

The levers of the disengaging devices of the cabin which have become useless, are placed out of operation and are locked. The levers of the signals are also placed out of operation, but are left attached to their wire connecting gear which simply becomes inoperative. At the same time these signals are provided with a new pneumatic connecting gear operated by a single-acting operating cylinder capable of receiving compressed air from the "combiner". The existing hand-power levers for the switches, bolts, tappets etc., may be kept in service and operated by hand power in the ordinary way, but the levers which are hard to move are provided with special motors that draw their power from the supply of the combiner. In the example shown these special motors consist of double-acting cylinders $90^a$ worked by compressed air. These switch points and levers, whether provided with special motors or not, have adapted to them two bolts 91 and 92 which are capable of entering alternately in engagement respectively with latches 93, 94 forming part of separate pneumatic locks 95, 96 fixed to the frame of the apparatus, in such a manner that in one extreme position of the lever, for example its right hand position, one of the bolts 91 will be engaged by the latch 93 of the corresponding lock 95, if the other bolt 92 is free facing its latch 94, while in the other extreme position of the lever, this other bolt 92 will be engaged by the latch 94, the first bolt 91 being free facing its latch 93. When a bolt is engaged by its latch the lever is fixed and is therefore under the influence of its central apparatus which produces the whole of the movements. These two pneumatic locks are connected each to a separate horizontal duct coming from the distributers just as if the switch were operated directly by pneumatic power locally.

As regards the application to switch points and signals of existing electric motors, the operating wires of the motors are connected in the central cabin to aero-electric relay valves (Fig. 31) situated at the end of pneumatic ducts which correspond respectively to each set of switch points or signals. As soon as the motive fluid arrives at the valve it raises the diaphragm 96ª which then contracts with the terminals 96ᵇ and closes the operating electrical circuit of the switch points or of the signal, and the motor begins its motion.

When the apparatus has operated, the electrical return control acts at the central apparatus upon a mixed electro-air valve (Fig. 32) which receives the current in a solenoid 96ᶜ the iron core 96ᵈ of which is raised. This raising movement acts upon a valve 97 which sends air from the main duct 98 through a duct 99 into the "totalizers" which thus work exactly as if the switch point-setting or signal-setting operation and the return checking operation of the track apparatus or the signal had taken place entirely by pneumatic means, that is to say, by the same form of energy.

As regards the application to hydro-dynamic motors it is sufficient to replace the mixed aero-electric valve and electro-air valves respectively by aero-hydraulic valves and hydro-pneumatic valves. Further, as a more general method, if the form of energy which is used in the central apparatus for combining the setting operations and for totalizing the control operations is electricity, then it can be applied to pneumatic motors, hydrodynamic motors etc. Finally, our system is designed for affording the protection of the block system to all complete or incomplete movements which take place within and in the passage through a station having branch tracks, the dependence of this automatic block obeying the general law of the continuity of the block by being connected with the ordinary apparatus, whatever be the arrangement thereof, of the blocks above and below the station.

The casing of the distributers of the apparatus is utilized for each line of transit (Fig. 16) for effecting by means of valves 39 a communication which insures the continuity of the block system above and below the station. A duct extends from each point of entry (Figs. 7 and 8) or of exit on one side into a section of the cabin and arrives opposite a whole distinct row of block valves. Similarly, a duct extends from each point of entry or of exit on the other side of the section of the cabin and arrives opposite a whole distinct column of block valves. At their terminus, at the ends of the sections of the cabin, these ducts are in communication with the block apparatus above and below the cabin or with the block pedals, etc., according to the kind of block in use on the main lines. They stop at the end of the row or of the column corresponding to the point whence they start. There are therefore (Fig. 16) two block ducts 40 and 41 which cross each other at right angles on each system of valves 39 corresponding to a distributer, or, what is the same thing, to a transit line. In this manner when a lever is moved in order to produce or control a transit line, the motive flux resulting therefrom operates the corresponding valves below the network of the block ducts. The valves then connect together the two parts of the block ducts which cross each other at right angles above them, thus forming a continuous duct between the two ends of the transit cabin. This pneumatic or electric or hydro-dynamic etc. duct (according to the kind of energy which is utilized) serves to transmit from above the signal box to below the same and vice versa, the communications appertaining to the block system. We are still assuming in the example chosen that compressed air is employed.

At each end of the block duct there is located an entrance device consisting of circular slides 101 (Fig. 33) on the axle of the apparatus 100 of the Aubine type connected to the wire transmission which operates the square signal S that controls the entry on to the track on that side. The Aubine apparatus is a well known mechanism by means of which a connection is normally maintained between the cabin wire and the signal wire, which connection, however, is broken upon a train's passing the point where the Aubine apparatus is located, so that the signal automatically falls to "danger"; and after the passage of the train the operator in the cabin can pick up the connection again by slackening the cabin wire, after which he may pull the signal to safety again. These slides 101 communicate by means of two ducts on one side with the general pressure duct 102 and on the other side with an intermediate reservoir 103.

I. When there is no lever in the central controlling lever board operated for a transit line having the signal S as origin, the cylinder 104 is without pressure, the crank plate 101 is pulled by the counter-weight 105. The signal S is at rest under the influence of the counter-weight. In this position the pedal or detecting bar 106 of the Aubine apparatus is inoperative, that is to say, is below the rail, and the two cranks are connected as one piece. The cylinder 104 for operating the signal is exhausting and consequently the wire transmission which connects it to that signal is slack.

II. In operating at the central controlling lever board, the lever of one of the transit lines having the signal S for its origin, the pressure coming from the check current in the cabin arrives at the controlling cylinder 104. The piston in the cylinder pulls one of the plates of the Aubine apparatus and draws the other plate with it; the signal is lowered or moved to "line clear" and the pedal 106 becomes engaged and rises above the rail.

III. On a train entering in consequence of this lowered signal, it presses on pedal 106 which then disconnects the two crank plates of the Aubine apparatus. The plate which is connected to the piston in the cylinder 104 does not move, the cylinder remaining under pressure. The crank plate connected to the signal having become free, follows the action of its counter-weight 105 of the signal S which then moves to danger and thus returns alone into its initial position. The two crank plates are then in different positions. When the lever referred to in the central controlling board is brought into its "rest" position, the cylinder 104 will return to exhaust; the counter-weight of the first crank plate will return this plate to its initial position which will then unite with the crank plate that was connected to the signal and that has already returned into the preceding phase. This reestablishes the position I.

These three positions are utilized for the movement of the slides connected to the pedal and which coöperates for working the block system (self-block in the cabin). This system of slides (Figs. 34 to 38) consists of a cylindrical box on the bottom of which rest two superposed disks 107 and 108 which are formed with suitable apertures and are keyed on different plates of the Aubine pedal. These disks are shown in developed section in Figs. 34 to 36. The pressure in the main duct arrives at 109 and forces the disks one against the other and against the lower end of the box. The pipe 110 passes to the intermediate reservoir. The pipe 111 goes to the exit apparatus of the pipe 112 of the lever board through the block duct. In the above position I (apparatus in the "rest" position) shown in Fig. 34, by the developed circular section of the circular slides, the pressure passes into the intermediate reservoir which fills, and the block duct communicates with the exit apparatus.

In the above position II (train expected) Fig. 35, the exit apparatus is cut off.

In the position III (train entering, Fig. 36) the communication with the adjacent exit apparatus is shut off and the pressure duct is cut off. The intermediate reservoir is in communication with the block duct passing to the lever board and discharges into that duct which is thus placed under pressure.

By the side of the entry apparatus there is located an exit apparatus 113 which is shown in Figs. 39 to 43. It comprises (1) an Aubine apparatus 114 of the same kind as that of the entry pedal, but which, contrary to the latter, is not connected to any signal; the crank plate being operated by an air cylinder 115 situated at the end of the block duct and the upper plate by a counterweight 116; (2) a long pedal 117 (Fig. 33) equal to the greatest distance between the axles of railway vehicles and mounted on small connecting rods and capable of moving alternately from its position of rest on the left hand situated below the rail into its operative position at the right hand below the rail.

In its movement from one position to the other the pedal projects beyond the top of the rail. This pedal is operated by a double-acting cylinder 118. The slides of the Aubine type of apparatus are arranged in the same manner as those of the entry apparatus, except that the openings formed in the disks vary. The pressure in the main duct (Figs. 39 to 43) arrives at 120 and produces tight joints between the disks $120^a$ and $120^b$ themselves and between the disks and the box $120^c$. The pipe 119 passes to the cylinder on the side that corresponds to the long pedal (right hand position). The pipe 121 passes to the same cylinder on the side corresponding to left hand position. Similarly the slides of this apparatus can have three relative positions as in the entry apparatus, namely:—

I. *Apparatus at rest* (Fig. 39).—There is no pressure in the block conduit. The main conduit passes to the double-acting cylinder operating the large pedal, and to that side of said cylinder which corresponds to the right-hand position of the said pedal. The other side of the cylinder, corresponding to the left-hand position of the pedal, is connected with the exhaust.

II. *Train entering* (Fig. 40).—The wire from the Aubine apparatus has been pulled by the action of the pressure arriving through the block duct, and the small pedal 122 of this Aubine apparatus has become operative. The right hand side of the cylinder of the large pedal is connected with the exhaust. The left hand side is closed.

III. *Train passing out.*—The train in passing out has operated the pedal 122, the plates of the Aubine apparatus have become disconnected (Fig. 41). The right hand side of the long pedal remains connected with the exhaust, but the left hand side receives the pressure. The pedal tends to rise in order to fall back into the left hand position. The cylinder of the exit pedals of the Aubine type is single-acting. The cylinder 118 of the large pedal (Fig. 44) is double acting. Its cover carries an exhaust valve 123 from the block duct. The piston 124 is in two parts between which are clamped the leathers designed to provide a tight joint. The piston rod ends in a block 125 to which is jointed the connecting rod of the large pedal. The cover 126 has a bulged portion in which is a valve 127 communicating at the top with the block duct through the duct 128 and at its lower part through the aperture 129 with the atmosphere. When the piston is at the end of its stroke on the side opposite to the cover, the block 125 comes in contact with the oscillating right angled piece 130 and forces it to raise the valve 127, thereby placing the block duct in connection with the exhaust.

We shall now resume the description of the general action of the self block.

In turning the lever of one transit line in order to produce a movement, the pressure passing to the switch points of the said line which are to be operated in the desired direction, serves to connect in one single continuous duct the two block ducts of each end of the transit-line (Figs. 16 and 33). The switch points having operated, the "totalizer" transmits to the lever board a pressure which acts upon the piston in the cylinder 104. This piston pulls the wire that connects it to the entry signal S through the medium of the apparatus 101 whose pedal 106 it renders operative. The plates of the Aubine apparatus having then moved into the position shown in Fig. 35, the signal is moved to "line clear". In this new position of the plates of the entering apparatus, the entry apparatus at this end is cut off from the block duct. The entry apparatus at this same end alone communicates with the exit apparatus at the other end of the transit line. The signal having been lowered the train enters in the direction of the arrow (Fig. 33). It depresses the pedal 106 of the entering apparatus 101; the signal S moves back to danger, and the entering slide takes up a new position (Fig. 36) in which the cylinder is cut off, while the intermediate reservoir 103 is placed in communication with the block duct and delivers pressure thereinto. This air passes to the lever board (Fig. 16), acts below the piston 43 below the lever that is operated, and continues up to the exit apparatus at the other end of the section. In passing to the lever board, the pressure board engages automatically with the lever by pushing its piston into one of the notches of the sector 34 fitted to this lever. On arriving at the exit at the other end the pressure fluid passes through the slide of the entering apparatus at that end which is at rest and acts in the cylinder 115 controlling the exit apparatus 114. The pedal 122 of this apparatus becomes operative, its slide moves and places the end of the cylinder which receives the pressure, in connection with the exhaust; the other end remains closed. The long pedal remains by its weight in the right hand position. The train arrives at the exit, depresses the pedal 122 of the apparatus 114 which then becomes disengaged. Its pedal remains inoperative. The slide in its second position transmits pressure to the cylinder 118 in such a manner as to cause the pedal to assume the left hand position, the other side being in connection with the exhaust. In rising again, the long pedal strikes against the wheels of the train and is unable to complete its movement. When the last wheel has passed over it the pedal completes its movement and moves to the left. At this moment the piston rod of the cylinder comes in contact with the right angled piece 130 (Fig. 44), raises an exhaust valve 127 that was closed by the pressure of the block duct to which it is connected. The entire block duct is then connected with the exhaust and with it the cylinder 118. The apparatus 114 is returned by its counterweight to its position of rest. The long pedal returns to its right hand position and the exhaust valve closes. When exhaust takes place the self-engagement of the lever in the signal box ceases. Then only the lever can be returned into its original position. This operation places the cylinder duct 53 in connection with the exhaust, and by its counterweight the apparatus returns likewise into its position of rest. Everything is now ready for a fresh operation.

The self block may be combined with the general block system of the line, whatever may be the type of the latter system. With ordinary blocks above and below the adjacent sections, it is necessary (a) on the entry of a train, that this train shall not be able to be unblocked in the section in front of the cabin until the said train shall have been actually taken in charge by the cabin; (b) on the exit of the train it shall not be possible to release the self block in the cabin in respect of this train, until the said train shall have been taken in charge in the following section in which it is entering. The ducts are provided by adding to the block apparatus hereinbefore described two new devices which vary with the block system adopted on the whole of the line on which the signal box is situated.

All that which has been stated hereinabove applies to complete movements for passing from one end to the other of the whole railway station, but it is often the case that it is desirable for the sake of rapidity and convenience of the service that a movement should be made (such as in the case of an engine which is being taken off the train) without the said engine having to pass right through the station. The system according to the present invention allows nevertheless of effecting this operation during the whole of the time that it is taking place inside the railway station and without possibility of forgetting it, such forgetting being capable of producing a collision with another movement that might take place on the same line. At the moment at which the engine which has entered a given train path in the manner of an ordinary train has stopped, the special lever 131 termed the backing lever is operated by being turned through 90 degrees (Figs. 45 and 46). By this means (1) the block is placed in connection with the exhaust in order to liberate the train path lever which has authorized the entry movement and (2) all the levers of the lines other than those to which the lever of the entry movement belongs, are engaged mechanically. The liberation of this last lever therefore liberates only all the levers in its own row. Thus, any one of these levers can be operated in order to prepare the transit line which is desired for the backing movement; (3) the controlling duct of the checking return and of the signal of the said same row is cut off, because without other precaution, in establishing this other transit line, it might be possible to lower the signal which controls the axes to one or the other end of the said line; but the ducts which feed all these signals being cut off, none of them can move to line clear. The engine thus remains effectively protected against collision and yet there is the facility of opening, for backing, it, any one of all the transit lines which converge fan-fashion towards the backing track.

When one of the free levers of the row for opening the backing track has been pulled, the backing lever can be again operated in such a manner as to cancel all provisionally established engagements, and an intermediate pressure reservoir connected to the backing lever sends its pressure into the block duct that is established by the lever which has just been pulled for this second transit line. The pressure passes to the exit apparatus at the two ends of the newly established transit line. From this moment the normal mechanical engagement of levers which are incompatible with the new lever and the "auto-combiner" block of the lever in question, is converted into a complete transitional engagement due to the backing lever. The engine returns into the station from the same side from whence it started and its regular movement upon the exit apparatus of the track will free the block engagement by which it was protected. Even if at the moment of backing, on second thoughts it were desired to cancel this movement and the engine was sent towards the point towards which it was making instead of being backed, or if the orders had been misunderstood and the driver was continuing along his track instead of backing the liberation of the block engagement would also be regularly effected in this case, because the exit apparatus at each end of the transit line has been engaged by transmitting through the whole block duct of the line in question, the pressure contained in the intermediate reservoir of the backing lever.

The backing lever is identical with the operating levers of the transit line. It can be rotated through 45° to the right or left. Its spindle operates valves 132 which are similar to the departure valves of the transit line levers. However, the function of the pressures transmitted by these valves differs. Each of the levers of the rows other than those of the backing levers has a particular device consisting of an octagonal cheek 133 (Figs. 45 and 46) which forms one with the lever spindle. Opposite all the cheeks of one of the same row there is a bar 134 guided and maintained parallel by the right hand crank 136 and the right angle crank 135. The right angled cranks 135 of the same lever board are connected to the vertical bar 137 that is attached to the right angled piece with roller 138, operated by the cam 139 forming one piece with the backing lever 131. In the "rest" position the roller is outside the projection of the cam. The bars liberate the cheeks, and the levers can rotate.

When, by the rotation of the backing lever, the cam has raised the roller, the bars come in contact with the faces of the octagon of the cheeks 133 and block the levers in the position in which they happen to be. The valve 132 of the backing lever is connected to the "totalizer". The pressure arrives above the valves and the exhaust takes place below as in the case of the starting valves above described. From the orifice 140 a duct passes to the reverse valves of the totalizers of the train paths of the backing row and to another reverse valve included in the block duct of the backing line. From the block orifice 141 a duct passes to the block duct with a check valve at the junction. Finally, the block having thus been established, it is further completed for each end of the train paths by a safety device which consists of a pedal which has a double function, namely (1) it places on the rail a detonator when no train is expected either at the entry or at the exit at this point, and this detonator would be exploded if a driver were to pass beyond the stopping signal and enter the section of the pointsman's cabin before one of the transit lines that commence at this point has been prepared by the chief of the central cabin; (2) it indicates in the cabin the untimely entrance of that train on to the section of the cabin by means of an acoustic signal such as a whistle and an optical signal such as a visible indicator. This pedal is shown at 142 in Fig. 47; it is provided with a counterweight 143 and is operated by a cylinder 144 which receives the presure of the main duct by a totalizer 145 having two elements similar to the one above described in Fig. 20. Each of these two elements receives from below the diaphragm the pressure coming from the slides of the entry and exit apparatus, when these two slides are in a position of rest, that is to say when no train is expected at that point either from the entry or from the exit end. At the end of the cylinder 144 there is a valve 146 (Fig. 50) which communicates with another valve 147 (Fig. 47) branching from the block duct. When no train is expected at the end of a journey either at the entry or at the exit, the pressure arrives from the valves 101 and 114 of the entry and exit apparatus of the block (modified according to Figs. 48 and 49) to the totalizer 145 which then sends the pressure into the cylinder 144. The pedal 142 is engaged, that is to say it projects above the top of the rail and the detonator 148 connected therewith is then placed on that rail. If a train enters the section of the signal box, namely without being expected, it crushes the detonator which explodes and thus signals the engine driver to top.

The pedal is depressed and acts either pneumatically or mechanically on the valve 146 which is fitted to the cylinder 144, and the compressed air then acts upon the valve 147 (Fig. 47) which cuts off the block duct on the side of the entry and exit apparatus, and sends the pressure from the main duct to the board. As no train is expected from the point in question there is no lever corresponding to that point. The block duct is therefore not cut off at any point and it continues throughout the extent of the lever table to the end thereof, where it terminates for the purpose in view in a whistle and a visible indicator 149. The arrival of the fluid pressure under these conditions consequently causes the whistle or other signal device to act and the head man of the cabin, who will also have heard the detonator explode, knows that a train has incautiously entered the section with the signal at danger, and also, at which point it has entered. He can therefore at once take the precaution necessary for preventing evil consequences of this irregular action.

We claim as our invention:—

1. In apparatus for working and interlocking railway switches and signals, the combination in a single structure of operating levers mounted on a pythagorean table, and interchangeable identical interlocking devices arranged in three planes, operated by said levers, substantially as described.

2. In apparatus for working and interlocking railway switches and signals, a geographical interlocking mechanism including operating levers arranged in the compartments of a table orthogonally crosswise disposed, and means for blocking, relatively to the lever actuated, all other levers situated in the northeast and southwest regions of the table and included in a cross through the lever actuated, substantially as described.

3. In apparatus for working and interlocking railway switches and signals, a table divided into compartments in horizontal rows and vertical columns, an operating lever in each compartment, cams on the shafts of said operating levers, interlocking levers moved by said cams, and horizontal and vertical bars engaged with said interlocking levers so as to produce interlockings thereof in the diagonal direction, substantially as described.

4. In apparatus for working and interlocking railway switches and signals, a table divided into compartments in horizontal rows and vertical columns, an operating lever in each compartment, and interlocking mechanisms applied to special levers or groups of levers and including cams on the shafts of said operating levers, interlocking levers moved by said cams, and horizontal and vertical bars engaged with said interlocking levers so as to produce interlockings thereof, substantially as described.

5. In apparatus for working and interlocking railway switches and signals, a table divided into compartments in horizontal rows and vertical columns, an operating lever in each compartment, cams on the shafts of said operating levers, interlocking levers moved by said cams, horizontal and vertical bars engaged with said interlocking levers so as to produce interlockings thereof, starting valves controlling pressure fluid and operated by said operating levers whereby the working devices of the switches are operated and the pressure fluid is conveyed thence to the signals of the transit line, said starting valve also effecting communication between the two ends of the fluid pressure duct corresponding to the said transit line, said starting valve being composed of two double valves arranged symmetrically and having a pressure duct situated above the valve box, a discharge duct below said box, and a duct of the apparatus to be worked communicating at the middle, and a rotary sector adapted to actuate one or other of said double valves as the sector is turned in one direction or the other.

6. In apparatus for working and interlocking railway switches and signals, a table divided into compartments in horizontal rows and vertical columns, an operating lever in each compartment, cams on the shafts of said operating levers, interlocking levers moved by said cams, horizontal and vertical bars engaged with said interlocking levers so as to produce interlockings thereof, double starting valves controlling pressure fluid, sectors operated by said operating levers and actuating said starting valves, and means for stopping the motion of a sector and operating lever consisting of a roller, a spring acting thereon, and a rod forming an extension of the axis of the sector and having three grooves which engage successively with said roller, substantially as described.

7. In apparatus for working and interlocking railway switches and signals, a table divided into compartments in horizontal rows and vertical columns, an operating lever in each compartment, cams on the shafts of said operating levers, interlocking levers moved by said cams, horizontal and vertical bars engaged with said interlocking levers so as to produce interlockings thereof, a distributing apparatus composed, firstly, of horizontal rows of distributers equal in number to that of the vertical rows of the operating lever board, the distributers of each row being equal in number to the horizontal rows of the lever board, and being connected by a suitable number of ducts to the apparatus operating the switch points; secondly, of rows of totalizers arranged in the same way as the distributers and in equal number therewith and connected with the apparatus operating the switch points by ducts equal in number to those connecting the distributers to the said apparatus; and, thirdly, of collectors equal in number to that of the signals, substantially as described.

8. In apparatus for working and interlocking railway switches and signals, means for operating the switch points and adapted to leave them, after the passage of a train, in the position necessary for such passage, so that there is no determined normal position of the switch points, corresponding to a position of rest to which the operating lever may return prematurely, substantially as described.

9. In apparatus for working and interlocking railway switches and signals, a block system including a single pressure fluid duct extending directly between the cabin and each point of entrance and issue of the section of railway controlled by said cabin and independent of the intermediate switches, an operating lever, and valves controlled thereby and adapted to connect the conduit of entrance and that of exit for a certain line of transit to form a single conduit, substantially as described.

10. In apparatus for working and interlocking railway switches and signals, a distributing apparatus comprising a series of chambers, entrance ducts and check valves therefor, and a common horizontal duct connecting said chambers, into which the fluid pressure may enter from any one of said chambers without being transmitted to the other chambers, and also comprising discharge branches, connected to the ducts of the several local apparatus, substantially as described.

11. In apparatus for working and interlocking railway switches and signals, a totalizer composed of one or more elements, a double valve in each element adapted to close communication between the contiguous elements and the main pressure fluid conduit, and a membrane adapted to be raised by a current of control pressure fluid coming from a set of switch points and to raise the corresponding valve.

12. In apparatus for working and interlocking railway switches and signals, totalizers arranged in vertical lines, and a collector composed of a common duct and a series of chambers with check valves opening into said duct and into the lower part of which chambers open the conduits coming from the totalizers of one and the same vertical line for reaching the signal to be operated, whereby the pressure from any one of said chambers may enter said duct without being transmitted to the other chambers, substantially as described.

13. In apparatus for working and interlocking railway switches and signals, a disengager comprising a valve adapted to admit the pressure fluid to a reversing valve of the totalizer of a transit line which is to be prohibited, substantially as described.

14. In apparatus for working and interlocking railway switches and signals, a reversing lever and interlocking mechanism adapted to protect the block system against all train movements that only enter the line section of a cabin without passing entirely through, substantially as described.

15. In apparatus for working and interlocking railway switches and signals, indicating devices upon the lever board of a cabin and in distant signal boxes, and means for operating said devices to indicate at a distance the movements effected in the said cabin during the whole time that they occur, substantially as described.

16. In apparatus for working and interlocking railway switches and signals, a safety device adapted to signal the unauthorized entry of a train into a section, to the cabin of that section, substantially as described.

17. In apparatus for working and interlocking railway switches and signals, a railway section having diagonal lines crossing parallel lines, switches at the intersections of the latter with the diagonal lines, fluid pressure apparatus operating each of said switches, fluid pressure ducts leading from each of said apparatus to a separate chamber of one of a series of distributing apparatus, a fluid pressure supply duct leading from each of said distributing apparatus to a source of fluid pressure, an admission valve in each supply duct, a board having intersecting vertical and horizontal rows of compartments, and means in each of said compartments for opening one of said admission valves to admit pressure fluid to the distributing apparatus and thence to the operating apparatus of all the switches which communicate with said distributing apparatus, substantially as described.

18. In apparatus for working and interlocking railway switches and signals, a railway section having diagonal lines crossing parallel lines, switches at the intersections of the latter with the diagonal lines, fluid pressure apparatus operating each of said switches, fluid pressure ducts leading from each of said apparatus to a separate chamber of one of a series of distributing apparatus, a fluid pressure supply duct leading from each said distributing apparatus to a source of fluid pressure, an admission valve in each supply duct, a board having intersecting vertical and horizontal rows of compartments, means in each of said compartments for opening one of said admission valves to admit pressure fluid to the distributing apparatus and thence to the operating apparatus of all the switches which communicate with said distributing apparatus, a signal at the entrance of the transit line to which said switches belong, an operating apparatus therefor, and a totalizing apparatus consisting of a number of chambers each communicating on the one hand with the discharge duct of one of the switch-operating apparatus which are in connection with said distributing apparatus, and communicating on the other hand with a duct common to all the chambers leading to the entrance signal of the said transit line, and means whereby, when all the switches of said transit line are correctly set, the discharge pressure fluid from all the said switch-operating apparatus is made to pass first to the totalizer, and thence to the signal-operating apparatus in order there to set the said signal to "line clear", substantially as described.

In witness whereof we have hereunto signed our names in the presence of two subscribing witnesses.

ALFRED MONARD.
  HORACE DUMARTIN.
  ERNEST ALBERT MOUTIER.

Witnesses:
  MARCEL ARMENGAUD, Jeune,
  HANSON C. COXE.